United States Patent
Zhao et al.

(10) Patent No.: US 9,762,983 B2
(45) Date of Patent: Sep. 12, 2017

(54) WAVELENGTH SELECTIVE SWITCH (71) Applicant: Huawei Technologies Co., Ltd., Shenzhen, Guangdong (CN)

(72) Inventors: Han Zhao, Shenzhen (CN); Liangjia Zong, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 15/043,828

(22) Filed: Feb. 15, 2016

(65) Prior Publication Data
US 2016/0165324 A1 Jun. 9, 2016

Related U.S. Application Data (63) Continuation of application No. PCT/CN2013/082091, filed on Aug. 22, 2013.

(51) Int. Cl.
*H04Q 11/00* (2006.01)
*G02B 6/34* (2006.01)
(Continued)

(52) U.S. Cl.
CPC ....... *H04Q 11/0005* (2013.01); *G02B 6/2706* (2013.01); *G02B 6/2938* (2013.01);
(Continued)

(58) Field of Classification Search
CPC ...... H04Q 11/0005; G02B 6/34; G02B 6/356; G02B 6/2706; G02B 6/2938; G02B 6/352;
(Continued)

(56) References Cited

U.S. PATENT DOCUMENTS 6,097,859 A 8/2000 Solgaard et al.
6,941,073 B2 9/2005 McGuire
(Continued)

FOREIGN PATENT DOCUMENTS

| CN | 201387495 A | 1/2010 |
|---|---|---|
| WO | WO 2010/001734 A1 | 1/2010 |
| WO | WO 2012/056987 A1 | 5/2012 |

*Primary Examiner* — Leslie Pascal (57) ABSTRACT

A wavelength selective switch includes: N input ports, an input-side fiber array, an input-side collimator array, an input-side beam deformation and polarization conversion component, an input-side wave-demultiplexing component, an input-side switching engine, a focusing transformation lens group, an output-side switching engine, an output-side wave-combining component, an output-side beam deformation and polarization conversion component, an output-side collimator array, an output-side fiber array, and M output ports. The focusing transformation lens group includes two identical aspheric convex lenses that are placed in parallel, where a curvature from a center to an edge of a surface of the aspheric convex lens changes continuously. A spatial position of the focusing transformation lens group and the curvature from the center to the edge of the surface are so set that light with different wavelengths from the input-side switching engine is focused to a corresponding position of the output-side switching engine respectively.

8 Claims, 5 Drawing Sheets

Top view (51) Int. Cl.
  *G02B 6/35* (2006.01)
  *G02B 6/27* (2006.01)
  *G02B 6/32* (2006.01)
  *G02B 6/293* (2006.01)
  *H04J 14/02* (2006.01)

(52) U.S. Cl.
  CPC ........... *G02B 6/29373* (2013.01); *G02B 6/32* (2013.01); *G02B 6/34* (2013.01); *G02B 6/35* (2013.01); *G02B 6/352* (2013.01); *G02B 6/356* (2013.01); *G02B 6/3512* (2013.01); *G02B 6/3546* (2013.01); *H04J 14/02* (2013.01)

(58) Field of Classification Search
  CPC .... G02B 6/32; G02B 6/29373; G02B 6/3546; G02B 6/3512; G02B 6/35; H04J 14/02
  See application file for complete search history.

(56) References Cited

U.S. PATENT DOCUMENTS

| | | |
|---|---|---|
| 2004/0228000 A1 | 11/2004 | Ikeda et al. |
| 2006/0067611 A1* | 3/2006 | Frisken .................. G02B 6/272 385/16 |
| 2009/0110349 A1 | 4/2009 | Presley et al. |
| 2012/0002917 A1 | 1/2012 | Colbourne |
| 2012/0038819 A1* | 2/2012 | McMackin ............ H04N 5/335 348/369 |
| 2012/0057869 A1 | 3/2012 | Colbourne |
| 2013/0235444 A1 | 9/2013 | Matsuura et al. |

* cited by examiner

WAVELENGTH SELECTIVE SWITCH

CROSS-REFERENCE TO RELATED APPLICATIONS

This application is a continuation of International Application No. PCT/CN2013/082091, filed Aug. 22, 2013, which is hereby incorporated by reference in its entirety.

TECHNICAL FIELD

The present invention relates to the field of communications, and in particular, to a wavelength selective switch used in optical communications.

BACKGROUND

With the rapid growth of video and cloud services, operators pay much attention to flexibility of construction of optical networks, and reduction of construction and operation and maintenance costs of the optical networks. Network nodes need increasingly more cross-connect direction dimensions (or transmission paths). The operators may remotely and automatically perform dimension switching by using a reconfigurable optical add/drop multiplexer (ROADM) to replace a manner in which a person goes to a site to switch a connection of a fiber, so as to satisfy requirements on a dynamic network connection. In order to adapt to requirements on efficiency and flexibility of high-speed optical communications networks, the ROADM as a network cross-connect core needs to be developed constantly.

In a current ROADM node, using a discrete component is a common implementation form. A node is constructed through interconnection of multiple 1×M wavelength selective switches (WSS) to implement routing and switching selection of different signals. When a network service volume increases, a quantity of 1×M wavelength selective switches needs to be increased to improve a service switching capability of the node. However, it needs to add a large quantity of module slots in an existing device, so as to connect to multiple 1×M wavelength selective switches, and consequently, costs of the device are increased, and with an increase in a service volume, the costs are increased sharply.

Figure 1:
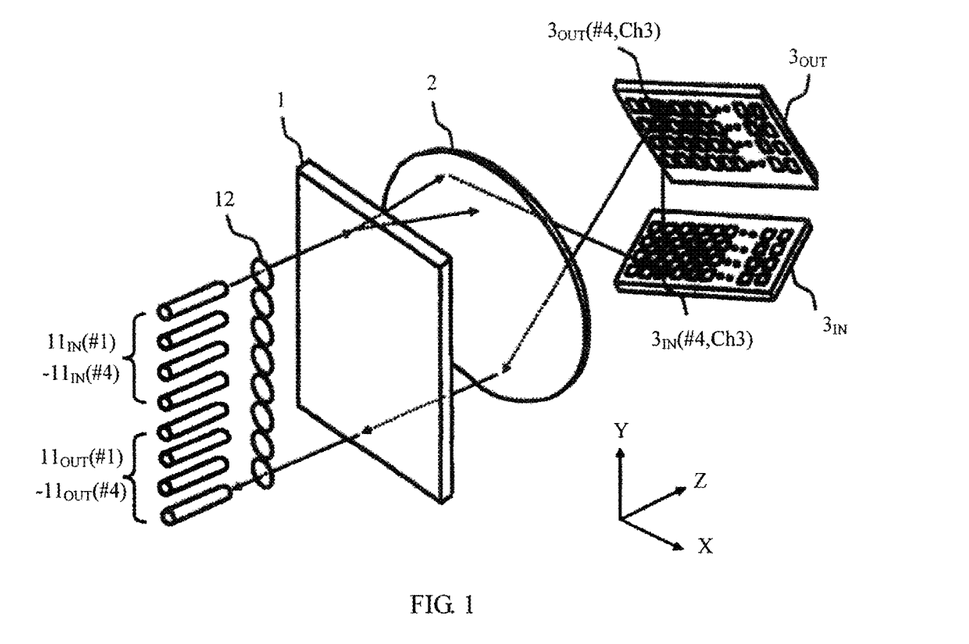
FIG. 1 is a schematic structural diagram of a WSS in the prior art.

At present, the 1×M wavelength selective switch is already relatively mature. However, there are no commercial products of N×M and N×N wavelength selective switches. Therefore, Fujitsu proposes a solution of an N×N WSS, as shown in FIG. 1. In this solution, a wavelength selective switch is provided with a fiber array, including four input fibers ($11_{IN}$ (#1) to $11_{IN}$ (#4)) and four output fibers ($11_{OUT}$ (#1) to $11_{OUT}$ (#4)), which are arranged in one column along one direction (a direction of a Y axis); and including eight collimators 12, a diffraction grating 1, a focusing lens 2, an input-side reflector (MEMS) array $3_{IN}$, and an output-side reflector (MEMS) array $3_{OUT}$, which are arranged in association with input and output fibers.

WDN light $L_{IN}$ (#1) to $L_{IN}$ (#4) output from the input fibers $11_{IN}$ (#1) to (#4) are transmitted to the diffraction grating 1 by using the collimator 12, and is divided, according to wavelengths of the light, into wavelengths Ch1(#1) to ChN(#1), Ch1(#2) to ChN(#2), Ch1(#3) to ChN(#3), and Ch1(#4) to ChN(#4). Then, the wavelengths are focused by using the focusing lens 2, and are transmitted to the input-side reflector (MEMS) array $3_{IN}$.

The input-side reflector (MEMS) array $3_{1N}$ has 4×N MEMS reflectors $3_{IN}$(#1, Ch1) to $3_{IN}$(#1, ChN), $3_{IN}$(#2, Ch1) to $3_{IN}$(#2, ChN), $3_{IN}$(#3, Ch1) to $3_{IN}$(#3, ChN), and $3_{IN}$(#4, Ch1) to $3_{IN}$(#4, ChN). Reflective surfaces of the reflectors are located at a focusing position of the wavelengths passing through the focusing lens 2. Angles of the reflective surfaces are determined by wavelength routing setting information. Herein, the input-side reflector (MEMS) array $3_{IN}$ is located at an angle of 45° relative to a direction of a Z axis.

The output-side reflector (MEMS) array $3_{OUT}$ is arranged at an angle of −45° relative to the direction of the Z axis, and has 4×N MEMS reflectors $3_{OUT}$ (#1, Ch1) to $3_{OUT}$(#1, ChN), $3_{OUT}$(#2, Ch1) to $3_{OUT}$(#2, ChN) $3_{OUT}$(#3, Ch1) to $3_{OUT}$(3, ChN) and $3_{OUT}$(#4, Ch1) to $3_{OUT}$(#4, ChN), which are configured to enable the wavelengths reflected by the input-side reflector (MEMS) array $3_{IN}$ to deflect in a direction towards a target output port.

After passing through the focusing lens 2, the reflected wavelengths are combined into WDM light $L_{OUT}$(#1) to $L_{OUT}$(#4) by the diffraction grating, and are coupled, by using the collimator 12, into the output fibers $11_{OUT}$(#1) to $11_{OUT}$ (#4) for output.

In this solution, in order to implement an N×N cross function, the input-side reflector (MEMS) array and the output-side reflector (MEMS) array need to be calibrated at the same time, and are difficult to be commissioned.

SUMMARY

In view of this, embodiments of the present invention provide a wavelength selective switch.

The embodiments of the present invention provide a wavelength selective switch WSS, where the WSS includes: N input ports, where N is a natural number greater than 1; an input-side fiber array connected to the N input ports; an input-side collimator array connected to the input-side fiber array; an input-side beam deformation and polarization conversion component connected to the input-side collimator array; an input-side wave-demultiplexing component connected to the input-side beam deformation and polarization conversion component; an input-side switching engine connected to the input-side wave-demultiplexing component; a focusing transformation lens group connected to the input-side switching engine and including two identical aspheric convex lens that are placed in parallel; an output-side switching engine connected to the focusing transformation lens group; an output-side wave-combining component connected to the output-side switching engine; an output-side beam deformation and polarization conversion component connected to the wave-combining component; an output-side collimator array connected to the output-side beam deformation and polarization conversion component; an output-side fiber array connected to the output-side collimator array; and M output ports, where M is a natural number greater than 1. The WSS is essentially implemented by connecting, by using the focusing transformation lens group, a 1×(N−1) WSS component to a 1×(M−1) WSS component. The two WSS components can be separately commissioned, and a difficulty in commissioning is low.

Optionally, the input-side fiber array and the output-side fiber array are arranged in two parallel columns along a direction but at different positions. In the prior art, an input fiber and an output fiber are arranged in one column along one direction (a direction of a Y axis), to cause that a component height is very large, a requirement on an angle of rotation of a reflector is very high, and it is not easy to implement a component with a large quantity of ports. However, the embodiments of the present invention can effectively reduce a height of the component, and can also lower a requirement on an angle of rotation (the angle of rotation is relatively small) of a switching engine, so that it is easy to implement a WSS with a large quantity of ports.

Specifically, a curvature from a center to an edge of a surface of the aspheric convex lens changes continuously, and is used to control focal lengths of light with different wavelengths; and a spatial position of the focusing transformation lens group and the curvature from the center to the edge of the surface are optimally so set that light with different wavelengths from the input-side switching engine is focused to a corresponding position of the output-side switching engine respectively. In the embodiments of the present invention, the curvature from the center to the edge of the surface of the aspheric convex lens changes continuously. Spatial position of the two aspheric convex lenses and the curvature from the center to the edge of the surface are properly and optimally set, so that the light with different wavelengths from the input-side switching engine is focused to the corresponding position of the output-side switching engine respectively, so as to implement an optical path connection from the input-side switching engine to the output-side switching engine.

Optionally, the input-side beam deformation and polarization conversion component includes a polarization splitting component, at least one prism, and a half-wave plate that are arranged in sequence, where the polarization splitting component is configured to convert unpolarized light from the collimator array into two beams of polarized light whose transmission directions are parallel and whose polarization directions are perpendicular to each other; the at least one prism is configured to enlarge a size of a light spot of the polarized light and a distance between the two beams of polarized light whose transmission directions are parallel and whose polarization directions are perpendicular to each other; and a spatial position of the half-wave plate is so set that one beam of polarized light of the two beams of polarized light whose transmission directions are parallel and whose polarization directions are perpendicular to each other passes through the half-wave plate, and the other beam of polarized light does not pass through the half-wave plate. A beam of corresponding polarized light is enlarged by using the prism, which enlarges the distance between the two beams of polarized light, so as to reduce an assembly difficulty of the half-wave plate.

Optionally, the input-side wave-demultiplexing component includes a diffraction grating, a dispersion compensation prism, and a focusing convex lens, where the diffraction grating is configured to separate, according to different wavelengths, light from the input-side beam deformation and polarization conversion component; the dispersion compensation prism is configured to perform dispersion compensation on the light that is separated by the diffraction grating; the focusing convex lens is configured to collimate light with different wavelengths from the dispersion compensation prism, and converge single-wavelength light from the dispersion compensation prism; and spatial positions of the diffraction grating, the dispersion compensation prism, and the focusing convex lens are so set that frequency intervals input light whose frequency intervals are equal is converted into light that is parallel in space and equally spaced, and the being equally spaced is that distances in a direction that is perpendicular to an arrangement direction of the input-side fiber array are equal. By setting the spatial positions of the diffraction grating, the dispersion compensation prism, and the focusing convex lens, light with equal frequency intervals that is emergent from the focusing lens is equally spaced in space. In this way, the input-side switching engine can set corresponding pixels or micro lens arrays for deflection that are equally spaced, which is easier to commission and correct relative to light signals that are unequally spaced.

Optionally, the output-side switching engine and the output-side fiber array form an included angle of θ, where θ may be greater than 0 degrees and smaller than 5 degrees. In the embodiments of the present invention, the output-side switching engine is made to form a small angle of rotation of θ along a direction of a fiber array, and therefore, 0-level diffraction light deviates from a fiber plane by an angle of 2θ. In this way, 0-level diffraction light at the output-side switching engine is basically not coupled into an output fiber, which increases port isolation of a module, and decreases crosstalk of a component.

Optionally, the input-side switching engine and the output-side switching engine are liquid crystal on silicon LCOS, the LCOS includes multiple deflection passbands that correspond to light with different frequencies respectively, a gap exists between the multiple deflection passbands that correspond to light with different frequencies respectively, and pixels in the gap are set to invalid pixels. The invalid pixel is equivalent to a plane reflector for direct reflection. In this way, light that is incident to the gap is basically not coupled into the output fiber, which can effectively suppress crosstalk.

Optionally, the aspheric convex lens is a doublet convex lens. The doublet convex lens can eliminate, to some extent, chromatic aberration caused by the aspheric convex lens, can more easily control the focal lengths of the light with different wavelengths, and more easily focus, to the corresponding position of the output-side switching engine, the light with different wavelengths from the input-side switching engine.

Optionally, N is equal to M. Optionally, the WSS further includes a controller, configured to control an angle by which light is deflected by the input-side switching engine and the output-side switching engine.

The WSS in the embodiments of the present invention can be considered to be implemented by connecting, by using a focusing transformation lens group, a 1×(N−1) WSS component to a 1×(M−1) WSS component. Basically, material costs do not rely on a quantity of ports. That is, costs of an N×M WSS do not increase with an increase in a quantity N or M of the ports. Therefore, the N×M WSS in the present invention has an advantage of low costs. Especially for an N×M WSS with a large quantity of ports, the cost advantage is obvious.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The present invention provides a new wavelength selective switch, which can implement a smaller module size, and implement a larger quantity of component ports, and also is favorable for calibration and commissioning. It should be noted that, a "connection" in the embodiments of the present invention refers to an optical path connection. A person skilled in the art may understand that specific optical components may not have a physical contact connection relationship, but spatial positions of the optical components and component features of the optical components make the optical components form an optical path connection relationship.

Figure 2:
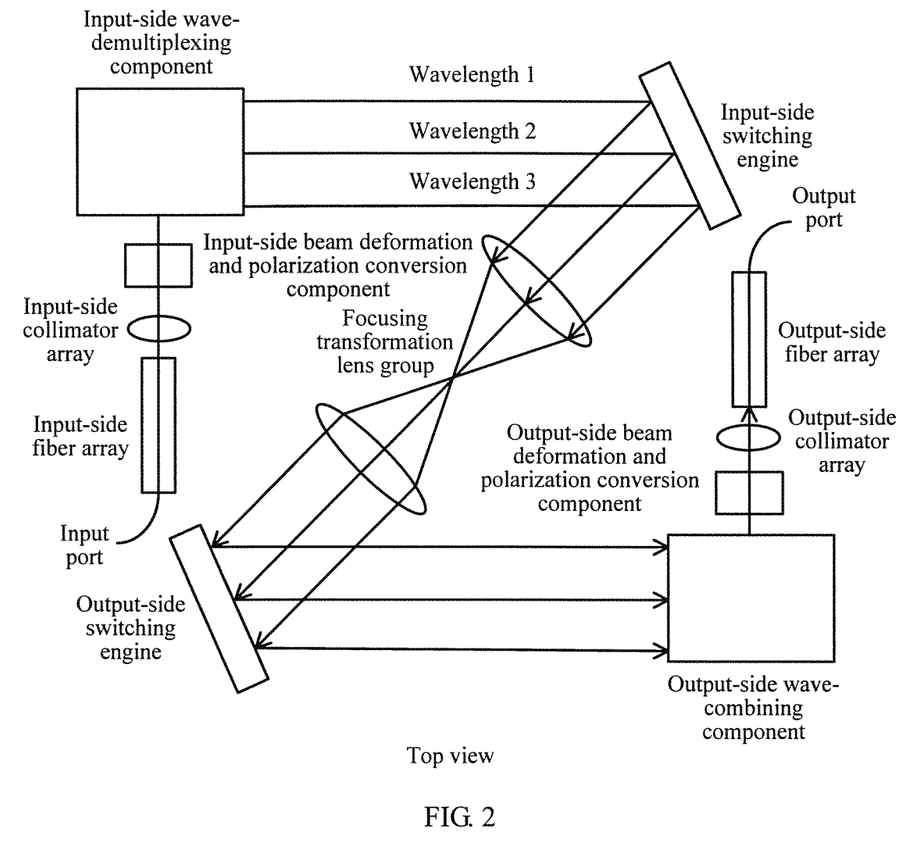
FIG. 2 is a structural top view of a WSS according to an embodiment of the present invention.

As shown in FIG. 2, the embodiments of the present invention provide a wavelength selective switch WSS, where the WSS includes: N input ports, where N is a natural number greater than 1; an input-side fiber array connected to the N input ports; an input-side collimator array connected to the input-side fiber array; an input-side beam deformation and polarization conversion component connected to the input-side collimator array; an input-side wave-demultiplexing component connected to the input-side beam deformation and polarization conversion component; an input-side switching engine connected to the input-side wave-demultiplexing component; a focusing transformation lens group connected to the input-side switching engine and including two identical aspheric convex lens that are placed in parallel; an output-side switching engine connected to the focusing transformation lens group; an output-side wave-combining component connected to the output-side switching engine; an output-side beam deformation and polarization conversion component connected to the wave-combining component; an output-side collimator array connected to the output-side beam deformation and polarization conversion component; an output-side fiber array connected to the output-side collimator array; and M output ports, where M is a natural number greater than 1.

FIG. 2 is a schematic top view of a WSS according to an embodiment of the present invention. Specifically, the input port is configured to input a light signal; the input-side fiber array is arranged in one row in a vertical direction, and is configured to transmit the light signal to the input-side collimator array; the input-side collimator array is arranged in one row in the vertical direction, and enables the light signal from the input-side fiber array to be transmitted to the input-side beam deformation and polarization conversion component in parallel, that is, is configured to convert the light signal from the input-side fiber array into parallel light and transmit the parallel light to the input-side beam deformation and polarization conversion component; the input-side beam deformation and polarization conversion component is configured to enlarge a size of a beam of the light signal, and is configured to convert the input light signal into polarized light in a polarized state; the input-side wave-demultiplexing component is configured to separate different wavelengths in the light signal from the input-side beam deformation and polarization conversion component; the input-side switching engine and the output-side switching engine may be micro-electro-mechanical systems (MEMS) or liquid crystal on silicon (LCOS), may set, according to wavelength routing setting information, a parameter of a corresponding MEMS mirror or a LCOS pixel, to adjust a deflection angle of incident light, and focus a corresponding light signal to a corresponding spatial position; correspondingly, the output-side wave-combining component is configured to combine the light signal and transmit the light signal to the output-side beam deformation and polarization conversion component; and the output-side beam deformation and polarization conversion component makes a beam of light from the output-side wave-combining component smaller, and performs polarization conversion; and light passes through the output-side collimator array and the output-side fiber array and arrives at the output port.

Figure 3:
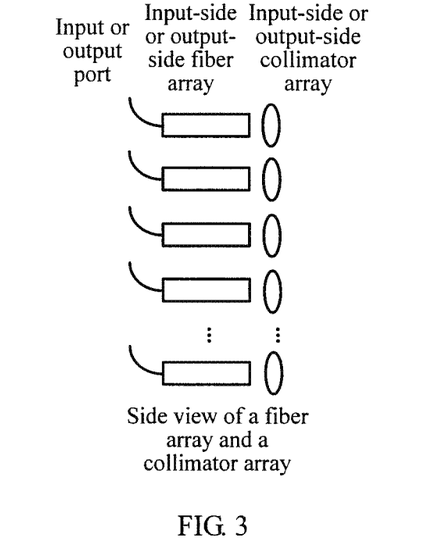
FIG. 3 is a schematic structural diagram of a fiber array and a collimator array in a WSS according to an embodiment of the present invention.

FIG. 3 provides a schematic side view of parts: a fiber array and a collimator array. It can be seen that in the vertical direction, the input-side fiber array, the output-side fiber array, the input-side collimator array, and the output-side collimator array are all arranged in a column. Functions of the components are universally known and are not described in detail herein.

Figure 4:
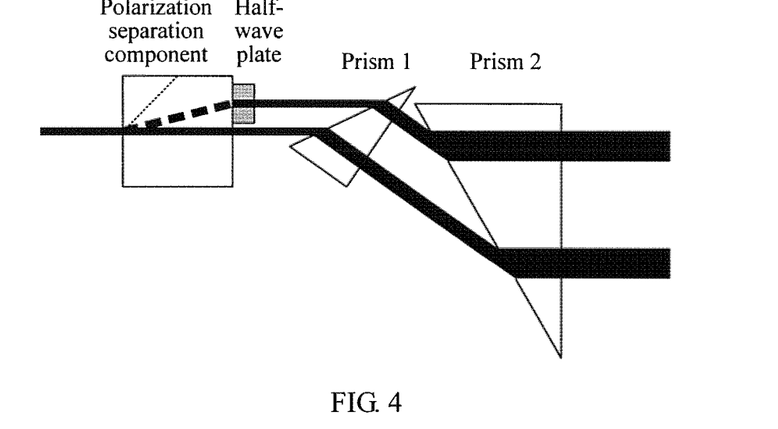
FIG. 4 is a schematic structural diagram of a beam deformation and polarization conversion component in a WSS according to an embodiment of the present invention.

FIG. 4 provides an exemplary input-side beam deformation and polarization conversion component in an embodiment of the present invention. The component includes a polarization separation component, a half-wave plate, and one or more prisms. The polarization separation component is configured to convert input light into two beams of polarized light whose polarization directions are perpendicular to each other; the half-wave plate is configured to further convert one beam of the polarized light into polarized light whose polarized state is the same as that of the other beam of polarized light; and the prism is configured to enlarge a size of a light spot of the two beams of polarized light and a distance between the two beams of polarized light, that is, enlarge the beam. A quantity of the prisms is exemplary. The quantity may be two, may be one, and certainly may be more. It should be noted that FIG. 4 is merely a top view of a corresponding component. Corresponding to FIG. 3, in the vertical direction, the components can act on light signals that are input by all input-side collimator arrays. Similarly, a person skilled in the art may understand that all components in the embodiments of the present invention can act on all corresponding light signals in the vertical direction, which is not described in detail below again. In addition, a person skilled in the art may understand that there are multiple components that can implement a function of beam deformation and polarization conversion, and the embodiments of the present invention provide only an example.

Figure 5:
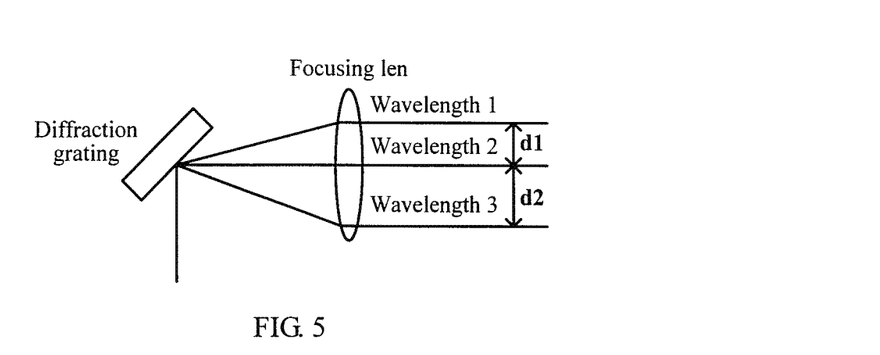
FIG. 5 is a schematic structural diagram of a input-side wave-demultiplexing component in a WSS according to an embodiment of the present invention.

FIG. 5 shows an exemplary input-side wave-demultiplexing component in an embodiment of the present invention. The component includes a diffraction grating and a focusing lens. The diffraction grating may be a reflective diffraction grating, or may be a transmissive diffraction grating (the figure only exemplarily provides the reflective diffraction grating). The diffraction grating is configured to separate different wavelengths. The focusing lens is configured to collimate light with different wavelengths from the diffraction grating, and converge single-wavelength light from the diffraction grating. In addition, a person skilled in the art may understand that there are multiple components that can implement a function of wave demultiplexing, and the embodiments of the present invention provide only an example.

The input-side switching engine and the output-side switching engine in the embodiments of the present invention may be micro-electro-mechanical systems (MEMS), or may be liquid crystal on silicon (LCOS). In the MEMS, a beam of light that falls on a micro reflector can be deflected by means of a mechanical movement of the micro reflector, so as to implement deflection of an optical path, thereby implementing switching of dimensions (or transmission paths) of light signal. In the LCOS, a blazed grating can be formed by setting a phase of a pixel, to deflect corresponding incident light.

FIG. 2 provides the top view. In fact, one important function of the WSS is to perform, between different ports, dimension switching on light signal with a corresponding wavelength in light signal from each input port. The process is implemented in three steps: one is that an input-side wave-demultiplexing module first separates wavelength multiplexed light from each port; one is that light signal is deflected in the vertical direction by using the input-side switching engine and the output-side switching engine, so as to implement allocation of each wavelength between the ports; and one is that an output-side wave-combining module combines wavelength multiplexed light from different input ports. Light of multiple wavelengths is involved. A position at which light signal of a wavelength at a fixed input port is incident to the input-side switching engine is fixed. A deflection angle that is implemented by controlling the micro reflector and a corresponding pixel at the position enables the incident light to be deflected by a corresponding angle in the vertical direction. Then, light after deflection is focused by the focusing transformation lens group, to focus the deflection light to a position that is corresponding to an output port of the output-side switching engine. The output-side switching engine deflects the incident light the second time according to the position that corresponds to an output port. Finally, the incident light is output by using the output port after steps of combining, beam deformation, and polarization conversion.

In the process, an important procedure is to focus, to the output-side switching engine, light from the input-side switching engine. Because the WSS is applicable to a multiple-wavelength transmission system, if light emergent from the input-side switching engine is focused by merely using a common convex lens, it is very difficult to ensure that light of each wavelength is converged to a specific position of the output-side switching engine. In addition, converging degrees of a same lens for different wavelengths are different, which also causes that sizes of light spots that arrive at the output-side switching engine are different, thereby affecting performance of the WSS.

The focusing transformation lens group in FIG. 2 includes two identical aspheric convex lenses that are placed in parallel. The focusing transformation lens group cooperates with the input-side switching engine and the output-side switching engine from a perspective of a spatial position, so as to focus, to the output-side switching engine, a light spot of a corresponding wavelength from the input-side switching engine. The embodiments of the present invention creatively use the focusing transformation lens group that includes two aspheric convex lenses, and can converge, to the corresponding output-side switching engine, with unchanged sizes, light spots from the input-side switching engine. A curvature from a center to an edge of a surface of the aspheric convex lens changes continuously, and is used to control focal lengths of light with different wavelengths, which is equivalent to that the aspheric convex lens includes multiple lens areas that correspond to different wavelengths respectively. The multiple lens areas have different focal lengths. A spatial position of the focusing transformation lens group and the curvature from the center to the edge of the surface are optimally so set that light with different wavelengths from the input-side switching engine is focused to a corresponding position of the output-side switching engine respectively. The curvature from the center to the edge of the surface of the aspheric convex lens changes continuously, and can control the focal lengths of the light with different wavelengths. The aspheric convex lens is equivalent to a set of multiple convex lenses. Each area corresponds to a respective wavelength. A corresponding wavelength is fixed, and an optical path length after a spatial position is fixed is also fixed. Therefore, it only needs to set a proper focal length corresponding to the wavelength, and light of the wavelength from the input-side switching engine can certainly be focused to a corresponding position of the output-side switching engine. Optionally, the transformation lens set is not limited to having only two convex lenses, and can include more components configured to adjust an optical path, such as a convex lens, a concave lens, and a cylindrical lens, provided that light spots of the input-side switching engine can be converged, with unchanged sizes, to the output-side switching engine. Optionally, the aspheric convex lens may be a common aspheric convex lens or may be a doublet convex lens.

In the embodiments of the present invention, the curvature from the center to the edge of the surface of the aspheric convex lens changes continuously, and is used to control the focal lengths of the light with different wavelengths. Spatial positions of the two aspheric convex lenses are properly set, so that the light with different wavelengths from the input-side switching engine can be separately focused to the corresponding position of the output-side switching engine, so as to implement an optical path connection from the input-side switching engine to the output-side switching engine.

A structure of the output-side wave-combining component is similar to a structure of the input-side wave-demultiplexing component, and because transmission directions of light are reverse, one implements a wave demultiplexing function, and one implements a wave combining function. A structure of an output-side beam deformation and polarization conversion component is similar to a structure of the input-side beam deformation and polarization conversion component. In addition, structures of the output-side collimator array, the output light array, and the output port are universally known, and are not described in detail herein.

Figure 6:
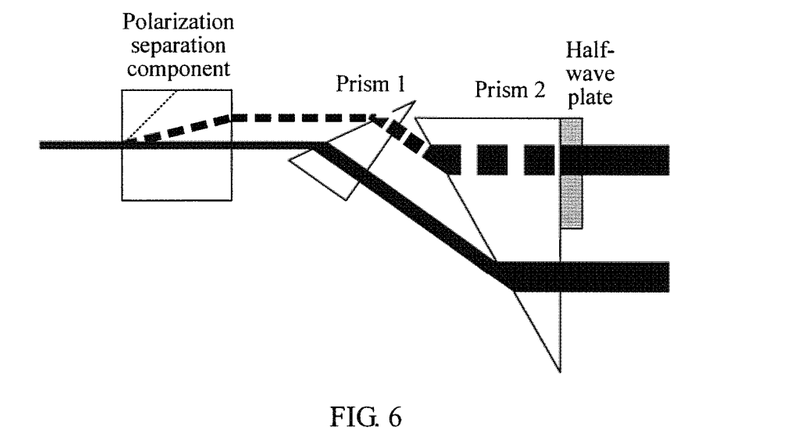
FIG. 6 is a schematic structural diagram of another beam deformation and polarization conversion component in a WSS according to an embodiment of the present invention.

Optionally, as shown in FIG. 6, the input-side beam deformation and polarization conversion component may further include a polarization splitting component, at least one prism, and a half-wave plate that are arranged in sequence, where the polarization splitting component is configured to convert unpolarized light from the collimator array into two beams of polarized light whose transmission directions are parallel and whose polarization directions are perpendicular to each other; the at least two prisms are configured to enlarge a size of a light spot of the polarized light and a distance between the two beams of polarized light whose transmission directions are parallel and whose polarization directions are perpendicular to each other; and a spatial position of the half-wave plate is so set that one beam of polarized light of the two beams of polarized light whose transmission directions are parallel and whose polarization directions are perpendicular to each other passes through the half-wave plate, and the other beam of polarized light does not pass through the half-wave plate. A quantity of the prisms in the figure is exemplary. The quantity may be more. A beam of corresponding polarized light is enlarged by using the prism group, which enlarges a distance between the two beams of polarized light. After the distance between the two beams of polarized light is enlarged, the half-wave plate is used to perform polarization direction conversion on one beam of polarized light thereof. Compared with that polarization direction conversion is performed before a beam of polarized light is enlarged in the prior art, the embodiments of the present invention reduce an assembly difficulty of the half-wave plate. This is the same to the output-side beam deformation and polarization conversion component.

Figure 7:
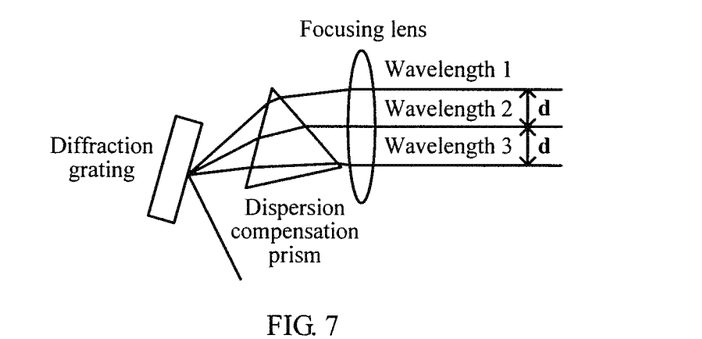
FIG. 7 is a schematic structural diagram of another input-side wave-demultiplexing component in a WSS according to an embodiment of the present invention.

Optionally, the input-side wave-demultiplexing component may also be shown in FIG. 7. The input-side wave-demultiplexing component includes a diffraction grating, a dispersion compensation prism, and a focusing convex lens, where the diffraction grating is configured to separate, according to different wavelengths, light from the input-side beam deformation and polarization conversion component; the dispersion compensation prism is configured to perform dispersion compensation on the light that is separated by the diffraction grating; the focusing convex lens is configured to converge light from the dispersion compensation prism; and spatial positions of the diffraction grating, the dispersion compensation prism, and the focusing convex lens are so set that input light whose frequency spectra are continuous is converted, according to different frequencies of the light, into light that is parallel in space and equally spaced, and the being equally spaced is that distances in a direction that is perpendicular to an arrangement direction of the input-side fiber array are equal. This is the same to the output-side wave-combining component.

Optionally, the output-side switching engine and the output-side fiber array form an angle of θ, where θ may be an included angle greater than 0 degrees and smaller than 5 degrees. After light from an input fiber is incident to the input-side switching engine (such as LCOS) by using a collimator is diffracted, 0-level diffraction light is directly reflected in a plane that is corresponding to an incident fiber, instead of being correspondingly deflected under control. The 0-level diffraction light that is directly reflected enters a wrong output port, thereby causing crosstalk. In the embodiments of the present invention, the output-side switching engine is made to form a small angle of rotation along a direction of a fiber array, and therefore, the 0-level diffraction light deviates from a fiber plane by an angle of 2θ. In this way, the 0-level diffraction light is basically not coupled into a wrong output port, which increases port isolation of a module, and decreases crosstalk of a component.

Figure 8:
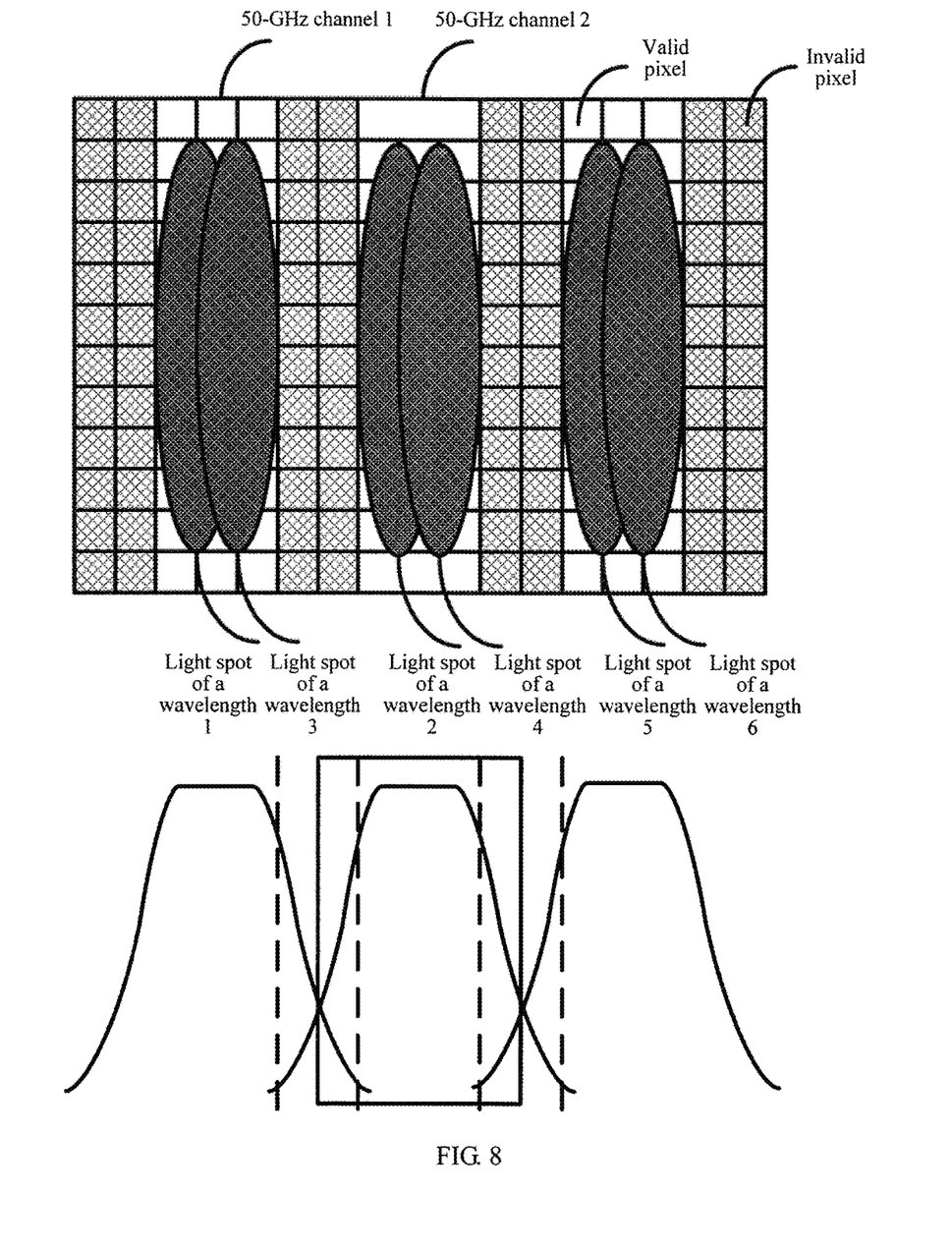
FIG. 8 is a schematic diagram of a structure and spectrum control of an input-side switching engine or an output-side switching engine in a WSS according to an embodiment of the present invention.

Optionally, the output-side switching engine is liquid crystal on silicon LCOS, the LCOS includes multiple deflection passbands that correspond to light with different frequencies respectively, a gap exists between the multiple deflection passbands that correspond to light with different frequencies respectively, and pixels in the gap are set to invalid pixels. As shown in FIG. 8, wavelength division multiplexing light that enters the input-side fiber array from the input port and that is emergent from the collimator array after being collimated by the collimator array enters the input-side wave-demultiplexing component, is separated, according to a frequency thereof, at equal spacings in a direction perpendicular to the fiber array, and is transmitted to the input-side switching engine. If the input-side switching engine is LCOS, for different wavelength channels, such as a 50-GHz channel, pixels on the LCOS can be set to invalid pixels at an edge of the channel according to the wavelength routing setting information. The pixels are not used to perform deflection processing on a wavelength beam at an edge of the 50-GHz channel. That is, the invalid pixels are used to implement control on a band edge of the 50-GHz channel; therefore, a passband shape is changed; and crosstalk can be effectively suppressed (the band edge is filtered out by filtering, and this part of signals do not enter an adjacent channel). For the output-side switching engine, a same setting for invalid pixels can be made.

Optionally, the input-side fiber array and the output-side fiber array are arranged in two parallel columns along a direction but at different positions. A light input and a light output in the embodiments of the present invention are relatively separated. Therefore, the input-side fiber array and the output-side fiber array, and the input port and the output port can be not limited to being arranged in a vertical column, so that a height of a component can be reduced, and more ports can be integrated.

Optionally, a person skilled in the art may understand that the input port and the output port of the wavelength selective switch may be the same or may be different, that is, the wavelength selective switch may be an N×N WSS or may be an N×M WSS.

Optionally, the WSS provided by the embodiments of the present invention may further include a controller, configured to control an angle by which light is deflected by the input-side switching engine and/or the output-side switching engine.

The WSS provided by the present invention is essentially implemented by connecting, by using a focusing transformation lens group, a 1×(N−1) WSS component to a 1×(M−1) WSS component. The two WSS components can be separately commissioned, and a difficulty in commissioning is low. In the embodiments of the present invention, a curvature of from a center to an edge of a surface of an aspheric convex lens changes continuously, and can control focal lengths of light with different wavelengths. Spatial positions of two aspheric convex lenses and the curvature from the center to the edge of the surface are properly so set that light with different wavelengths from an input-side switching engine is focused to a corresponding position of an output-side switching engine respectively, so as to implement an optical path connection from the input-side switching engine to the output-side switching engine. In addition, a beam of corresponding polarized light is enlarged by using a prism group, which enlarges a distance between two beams of polarized light, so as to reduce an assembly difficulty of a half-wave plate. And also, light that is emergent from an input-side wave-demultiplexing component in the embodiments of the present invention and light that is incident to an output-side wave-combining component are equally spaced, and it is easier to commission and calibrate.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wavelength selective switch (WSS), comprising:
   N input ports, wherein N is a natural number greater than 1;
   an input-side fiber array connected to the N input ports;
   an input-side collimator array connected to the input-side fiber array;
   an input-side beam deformation and polarization conversion component connected to the input-side collimator array;
   an input-side wave-demultiplexing component connected to the input-side beam deformation and polarization conversion component;
   an input-side switching engine connected to the input-side wave-demultiplexing component;
   a focusing transformation lens group connected to the input-side switching engine and comprising two identical aspheric convex lenses that are placed in parallel, wherein a curvature from a center to an edge of a surface of the aspheric convex lenses changes continuously, and is used to control focal lengths of light with different wavelengths, wherein a spatial position of the focusing transformation lens group and the curvature from the center to the edge of the surface of the aspheric convex lenses are so set that light with different wavelengths from the input-side switching engine is focused to a corresponding position of an output-side switching engine respectively, the output-side switching engine connected to the focusing transformation lens group;
   an output-side wave-combining component connected to the output-side switching engine;
   an output-side beam deformation and polarization conversion component connected to the output-side wave-combining component;
   an output-side collimator array connected to the output-side beam deformation and polarization conversion component;
   an output-side fiber array connected to the output-side collimator array;
   M output ports, wherein M is a natural number greater than 1;
   wherein the input-side wave-demultiplexing component comprises:
     a diffraction grating,
     a dispersion compensation prism, and
     a focusing convex lens, wherein:
       the diffraction grating is configured to separate, according to different wavelengths, light from the input-side beam deformation and polarization conversion component,
       the dispersion compensation prism is configured to perform dispersion compensation on the light that is separated by the diffraction grating,
       the focusing convex lens is configured to collimate light with different wavelengths from the diffraction grating, and converge single-wavelength light from the diffraction grating, and
       spatial positions of the diffraction grating, the dispersion compensation prism, and the focusing convex lens are such that input light whose frequency intervals are equal is converted into light that is parallel in space and equally spaced in a direction that is perpendicular to an arrangement direction of the input-side fiber array.

2. The WSS according to claim 1, wherein the input-side fiber array and the output-side fiber array are arranged in two parallel columns along a direction but at different positions.

3. The WSS according to claim 1, wherein:
   the input-side beam deformation and polarization conversion component comprises a polarization splitting component, at least one prism, and a half-wave plate that are arranged in sequence, wherein the polarization splitting component is configured to convert unpolarized light from the collimator array into two beams of polarized light whose transmission directions are parallel and whose polarization directions are perpendicular to each other;
   the at least one prism is configured to enlarge a size of a light spot of the polarized light and a distance between the two beams of polarized light whose transmission directions are parallel and whose polarization directions are perpendicular to each other; and
   a spatial position of the half-wave plate is so set that one beam of polarized light of the two beams of polarized light whose transmission directions are parallel and whose polarization directions are perpendicular to each other passes through the half-wave plate, and the other beam of polarized light does not pass through the half-wave plate.

4. The WSS according to claim 1, further comprising a controller, configured to control an angle by which light is deflected by the input-side switching engine and/or the output-side switching engine.

5. The WSS according to claim 1, wherein the output-side switching engine and the output-side fiber array form an included angle greater than 0 degrees and smaller than 5 degrees.

6. The WSS according to claim 1, wherein:
   the output-side switching engine is liquid crystal on silicon (LCOS), the LCOS comprises multiple deflection passbands that correspond to light with different frequencies respectively, a gap exists between the multiple deflection passbands that correspond to light with different frequencies respectively, and pixels in the gap are set to invalid pixels.

7. The WSS according to claim 1, wherein each aspheric convex lens is a doublet convex lens.

8. The WSS according to claim 1, wherein N is equal to M.

* * * * *